UNITED STATES PATENT OFFICE.

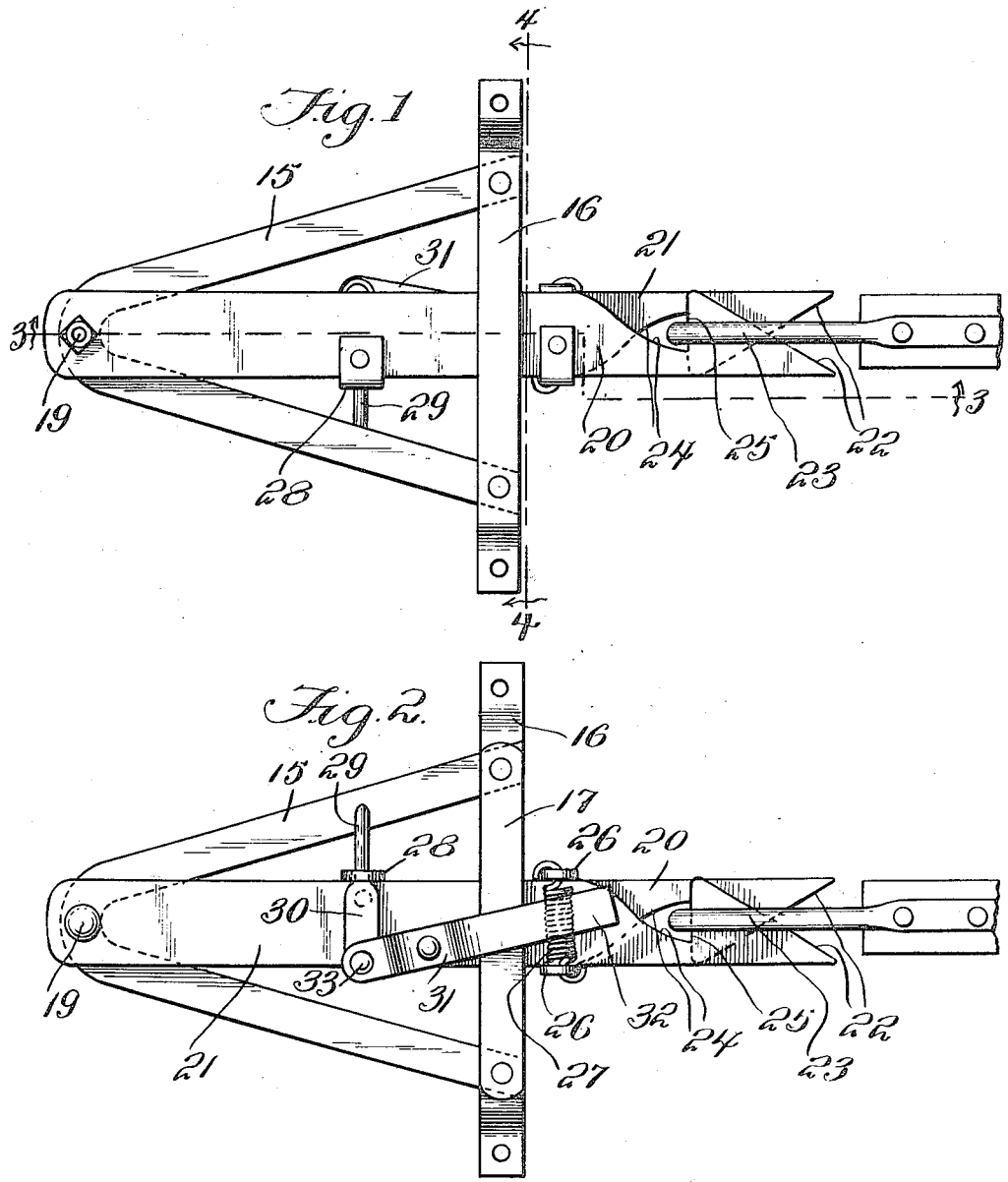

JACOB JUNTUNEN, OF PERTH, NORTH DAKOTA.

COUPLING.

1,252,349.         Specification of Letters Patent.         Patented Jan. 1, 1918.

Application filed June 6, 1916.   Serial No. 102,003.

*To all whom it may concern:*

Be it known that I, JACOB JUNTUNEN, a citizen of the United States, residing at Perth, in the county of Towner and State of North Dakota, have invented new and useful Improvements in Couplings, of which the following is a specification.

This invention relates to coupling devices, and it has particular reference to an improved coupling device whereby a tractor may be quickly and securely connected with the load to be drawn thereby, such as a threshing rig, a wagon or an agricultural machine of any kind.

A further object of the invention is to produce a coupling which will readily adapt itself to the side strain caused when turns are to be made without danger of the coupling being disconnected.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—

Figure 1 is a top plan view of a coupling device constructed in accordance with the invention.

Fig. 2 is a bottom plan view of the same.

Corresponding parts in the several figures are denoted by like characters of reference.

Figure 3:
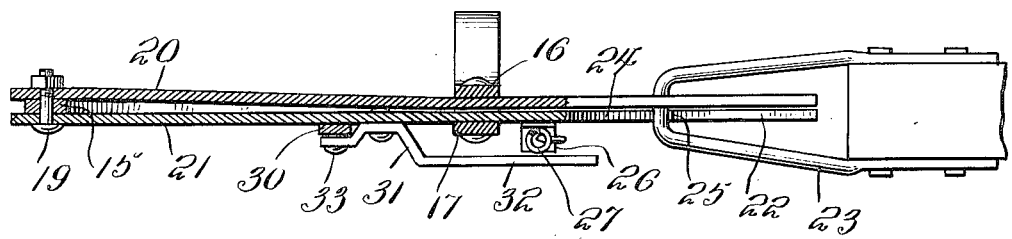
Fig. 3 is a longitudinal sectional view taken on the line 3—3 in Fig. 1.
Figure 4:
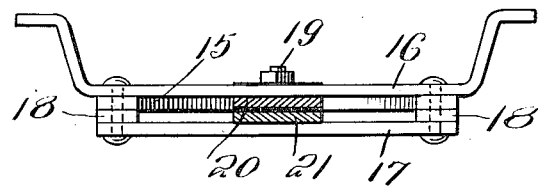
Fig. 4 is a transverse sectional view taken on the line 4—4 in Fig. 1.
Figure 5:
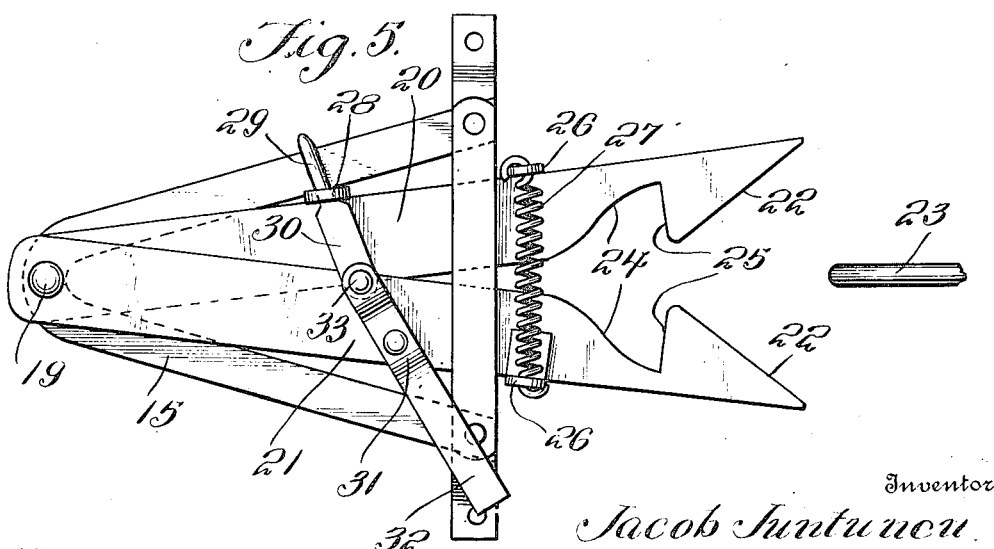
Fig. 5 is a bottom plan view showing the coupling open for the reception of a coupling link or loop.

The body portion of the improved coupling consists of a V-shaped frame 15, the limbs of which are connected at their forward ends by top and bottom cross bars 16, 17 which are spaced apart by the thickness of the limbs of the frame 15, and also if desired by washers 18 which may be inserted between said limbs and one or both of the cross bars. Extending vertically through the frame 15 at the apex thereof is a bolt or pivot member 19 on which two coupling bars 20, 21 are pivoted, one above and the other below the frame, said coupling bars extending forwardly between and beyond the top and bottom cross bars 16, 17. The forward extremities of the coupling bars are oppositely beveled, as seen at 22, to facilitate the admission therebetween of a coupling link or loop 23, the opposed edges of the coupling bars being also provided with recesses 24 whereby hooks 25 are formed for engagement with the coupling link or loop.

The coupling bars are provided at their outer edges with lugs 26 which are connected together by a spring 27, the tension of which is exerted to close the coupling bars together on the loop or link 23. One of the coupling bars has an apertured lug 28 through which is guided a pin 29 having a head 30. Fulcrumed on the other coupling bar is a lever 31 one arm of which constitutes a handle 32 and the other arm of which is pivotally connected at 33 with the head 30. The pin 29 is not only capable of sliding freely through the lug 28, but it also has a rocking movement in said lug.

To separate the coupling bars or to spread them apart for the reception of the coupling link or loop therebetween the lever 31 is turned by its handle 32 about its fulcrum, causing the head 30 of the pin 29 to press against the lug 28, thereby forcing the coupling bars apart against the tension of the spring 27. If the axis of the pivot member 33 is permitted to swing beyond a dead center, the coupling bars will be maintained in extended relation. The coupling link or loop may now be readily introduced between the coupling bars after which, by manipulating the lever 31, the said coupling bars are permitted to move under the tension of the spring 27 into closed or overlapping relation, when the coupling link or loop will be securely retained by the hooks 25 within the recessed portions 24 of the coupling bars. The latter are free to swing about the axis of the pivot member 19 within the limits of the V-shaped frame, and the coupling will, therefore, readily adapt itself to any turns that are to be made without unduly straining parts thereof.

Having thus described the invention, what is claimed as new, is:—

A coupling device comprising a V-shaped frame, upper and lower cross bars connected with the limbs of said frame and spaced apart, a pivot member at the apex of the frame, upper and lower coupling bars mounted on said pivot member, respectively above and below the frame and extending forwardly between the spaced cross bars between which said coupling bars are guided, their swinging movement being limited between the limbs of the frame, a spring whereby said coupling bars are connected in advance of the cross bars and means for spreading the coupling bars against the tension of the spring, said means including an apertured lug connected with one coupling bar, a headed pin extending through said lug and abutting thereon, a lever pivoted on the other coupling bar, and a pivotal connection between the lever and the headed pin.

In testimony whereof I affix my signature.

JACOB JUNTUNEN.